(12) United States Patent
Holley

(10) Patent No.: US 6,497,088 B1
(45) Date of Patent: Dec. 24, 2002

(54) ROTARY MOWER WITH LIQUID APPLICATOR

(76) Inventor: Larry R. Holley, Rte. 11, Box 588, Lake City, FL (US) 32024

( * ) Notice: Subject to any disclaimer, the term of this patent is extended or adjusted under 35 U.S.C. 154(b) by 0 days.

(21) Appl. No.: 09/638,778

(22) Filed: Aug. 15, 2000

(51) Int. Cl.[7] .............................................. A01D 19/00
(52) U.S. Cl. ........................................ 56/16.8; 239/67
(58) Field of Search .................................. 56/16.8, 12.1, 56/16.4 R, DIG. 5, 255, 295; 239/67, 68, 69, 100, DIG. 6

(56) References Cited

U.S. PATENT DOCUMENTS

| | | | | |
|---|---|---|---|---|
| 2,908,444 A | * | 10/1959 | Mullin | 239/223 |
| 2,936,563 A | * | 5/1960 | Blume | 56/12.1 |
| 2,939,636 A | * | 6/1960 | Mullin | 239/214.21 |
| 3,332,221 A | * | 7/1967 | McCain | 56/295 |
| 3,402,668 A | * | 9/1968 | Pusztay | 415/121.3 |
| 3,722,820 A | * | 3/1973 | Klint, Jr. | 239/129 |
| 4,107,816 A | * | 8/1978 | Matthews | 15/320 |
| 4,264,999 A | * | 5/1981 | Monson | 15/321 |
| 4,926,622 A | * | 5/1990 | McKee | 56/16.8 |
| 5,195,308 A | * | 3/1993 | Grote et al. | 56/16.4 R |
| 5,237,803 A | | 8/1993 | Domingue, Jr. | |
| 5,312,044 A | * | 5/1994 | Eaton | 239/225.1 |
| 5,517,715 A | * | 5/1996 | Monson | 15/320 |
| 5,673,856 A | * | 10/1997 | Krohn | 239/276 |
| 5,765,348 A | * | 6/1998 | Thagard et al. | 56/15.2 |
| 6,145,288 A | * | 11/2000 | Tamian et al. | 56/16.8 |
| 6,164,049 A | * | 12/2000 | Burch | 56/16.8 |
| 6,260,340 B1 | * | 7/2001 | Sanner | 56/16.8 |

* cited by examiner

Primary Examiner—Robert E. Pezzuto
Assistant Examiner—Árpád Fab Kovács
(74) Attorney, Agent, or Firm—Polster, Lieder, Woodruff & Lucchesi, L.C.

(57) ABSTRACT

A rotary mower has a cutting blade and, spaced above it, a fan blade mounted to be rotated on the same axis of rotation as the cutting blade. It has at least one nozzle fixed with respect to the fan and cutting blades, and positioned to spray liquid in a direction substantially parallel to the planes of rotation of the cutting and fan blades, and between those planes of rotation. The nozzle is positioned behind a member with a slot in it, the nozzle projecting spray through the slot and being shielded by the member from damage.

18 Claims, 4 Drawing Sheets

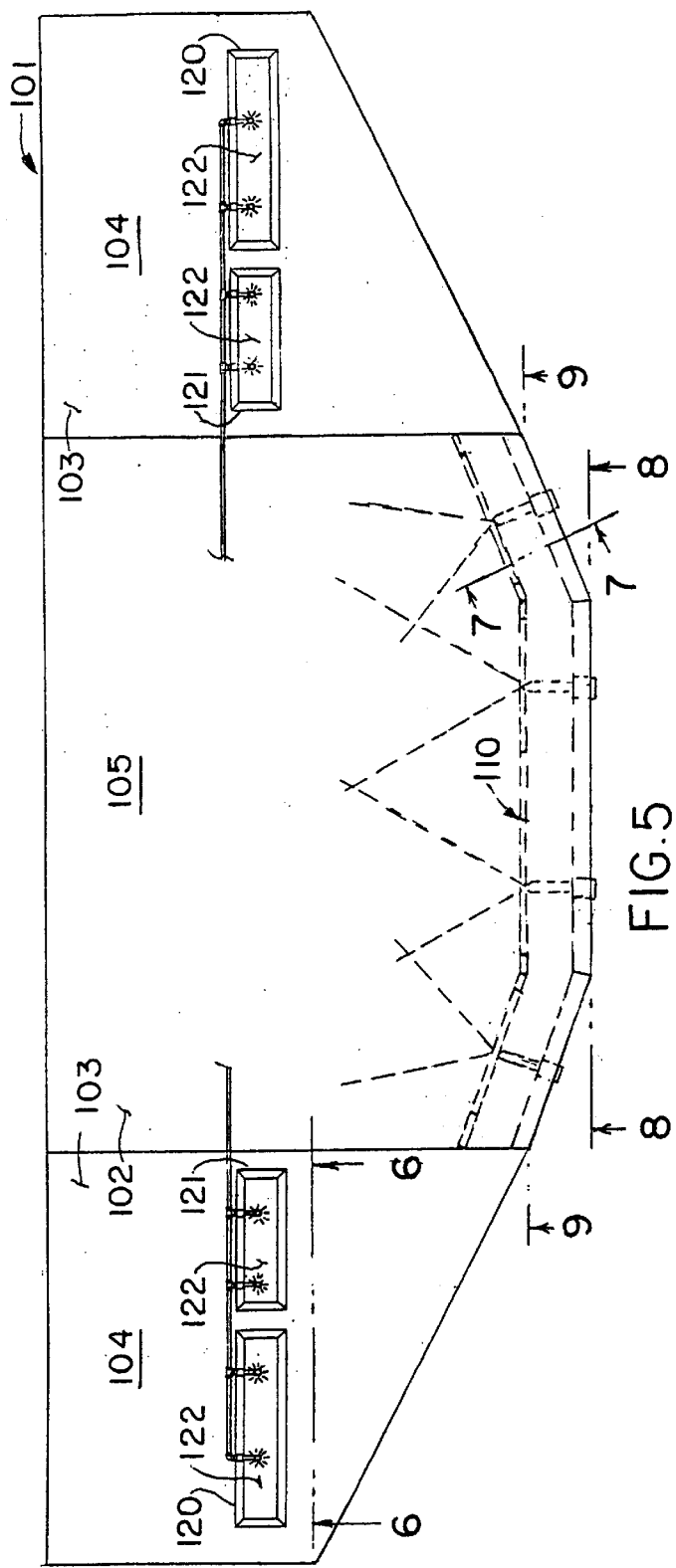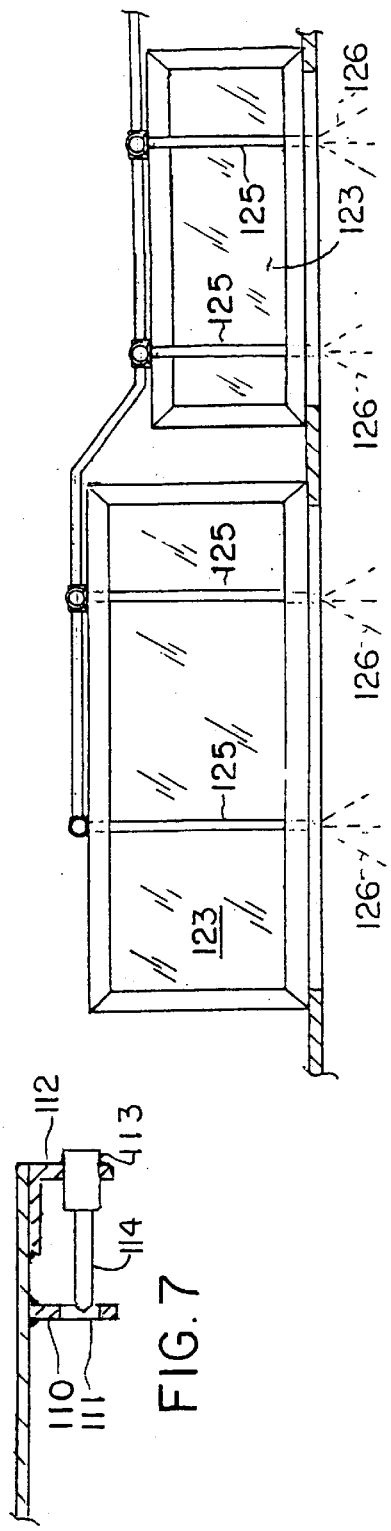

US 6,497,088 B1

ROTARY MOWER WITH LIQUID APPLICATOR

CROSS-REFERENCE TO RELATED APPLICATIONS

STATEMENT REGARDING FEDERALLY SPONSORED RESEARCH OR DEVELOPMENT

Not Applicable.

BACKGROUND OF THE INVENTION

The challenge of applying herbicide, fertilizers, insecticides or the like at the same time as grass, weeds, or crops are mowed with a rotary motor, such as a Bush Hog, has been addressed in numerous patents. One of the latest, U.S. Pat. No. 5,237,803, sets out the general background.

One of the difficulties with prior art devices has been the atomization of the liquid, which leads to dispersion of the fluid in the form of vapor.

One of the objects of this invention is to provide a mower-applicator in which the particle size of the liquid being applied is readily controlled as is the area of its application.

Other objects will become apparent to those skilled in the art in light of the following description and accompanying drawing.

BRIEF SUMMARY OF THE INVENTION

In accordance with one embodiment of this invention, generally stated, in a mower and liquid applicator having a housing with a top wall and a depending side wall, a cutter blade mounted to be rotated on a vertical central axis to define a plane of rotation, a baffle wall extends from an under surface of the housing top wall, spaced inboard from the housing side wall and extending downwardly from the housing top wall to a place above the cutter blade and inboard of outer ends of the cutter blade. A fan blade is mounted to be rotated on an axis coincident with the axis of rotation of the cutter blade, spaced inboard of and within the compass of the baffle wall and spaced to define a plane of rotation above the plane of rotation of the cutter blade. At least one spray nozzle is fixed with respect to the housing and baffle and blades, and is positioned to project a spray of liquid between the planes of rotation of the cutter blade and the fan blade. The spray nozzle is operatively connected to a conduit between the nozzle and a source of liquid.

In another embodiment, spray nozzles in side mowers of a batwing type mower are positioned in boxes mounted above the top walls of the outboard mower housings, and project spray downwardly through slots in the top wall, the spray nozzles themselves being shielded by the top wall against damage from stones and the like hurled by the cutting blades. In the center mower of the batwing, spray nozzles are mounted in a bracket spaced outwardly from a heavy curtain plate welded along the leading edge of the mower housing, through which spray is projected by the nozzles in a direction generally parallel to the ground, the nozzles being shielded by the curtain plate.

BRIEF DESCRIPTION OF THE SEVERAL VIEWS OF THE DRAWINGS

In the drawings.

FIG. 5 is a top plan view of a second embodiment of mower-applicator of this invention;

FIG. 6 is a sectional view in side elevation, taken along the line 6—6 of FIG. 5, showing a top wall of a mower housing with spray boxes mounted on it;

FIG. 7 is a fragmentary sectional view taken along the line 7—7 of FIG. 5;

DETAILED DESCRIPTION OF THE INVENTION

Figure 1:
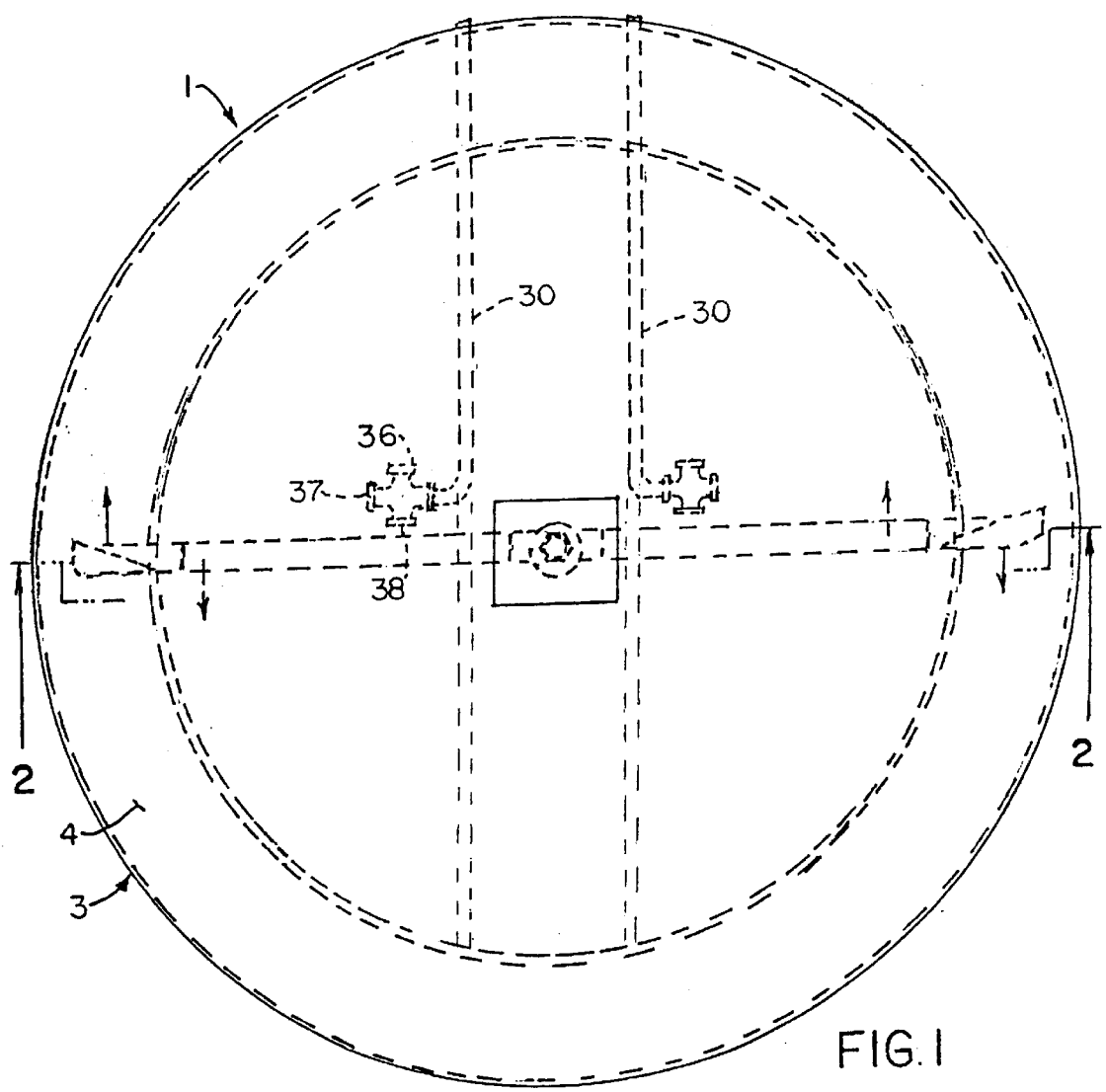
FIG. 1 is a top plan view of one illustrative embodiment of mower applicator of this invention.

Referring now to the drawing for one illustrative embodiment of this invention, reference numeral 1 indicates the assembled device, which, as illustrated in U.S. Pat. No. 5,237,803, is designed to be pulled behind a tractor or made self-propelling. The means for moving the device are conventional and do not form part of this invention. The device has a housing 3, with a top wall 4, with an inner surface 5, and a side wall 6, which, in the embodiment shown, is circular in plan. This construction is also conventional. Within the compass of the side wall 6, the device has a baffle wall 9, spaced inboardly from the side wall 9 to define a plenum 1, which in this embodiment is toroidal. A cutter blade 13 has arms 14, the outer ends of which extend beyond the compass of the baffle wall 9 and are curved to blow air upwardly into the plenum 11. The cutter blade 13 is mounted on a shaft 18, to which it is mounted by a nut 19, conventionally.

In a commercially available cutter sold as the "CR-Series rotary cutters from Bush Hog", a Division of Allied Products Corporation, counter-rotating cutters are rotated through a gear box with twin gear box shafts. In the preferred embodiment of this invention, shaft 18 and another shaft or hub 23 are counter-rotated in the same way, through a gear box 41 shown somewhat diagramatically as containing driven bevel gears 43 and 45, meshed with a drive gear 55 secured to a shaft 56 driven from a power take off. A fan blade 22, with two arms 26, is secured to the hub 23, in this embodiment to rotate counter to the rotation of the cutter blade 13. The rotations of the fan blade 22 and the cutter blade 13 define planes of rotation substantially parallel to one another and spaced vertically.

In the embodiment shown in FIGS. 1 and 2, conduits in the form of two, square, one inch pipes 30 are fixed in the side wall 6 and the baffle wall 9 at one, open end, and attached, for support, to the baffle wall at a closed end. The pipes 30 extend parallel with one another on either side of the shaft axis, between the cutter blade 13 and the fan 22. Within the housing, the conduits 30 are connected to a front head 33 and a rear head 34, respectively. The heads 33 and 34 are 4-way Tees, one branch of which serves as a fitting to mount to a threaded end of a conduit, and the other three of which hold flat fan tipped nozzles 36, 37 and 38, oriented to provide a spray pattern substantially parallel to the planes of rotation of the blades and within the confines of the two planes of rotation, the distribution pattern being shown somewhat diagramatically in dotted lines in FIG. 3.

Figures 3, 4:
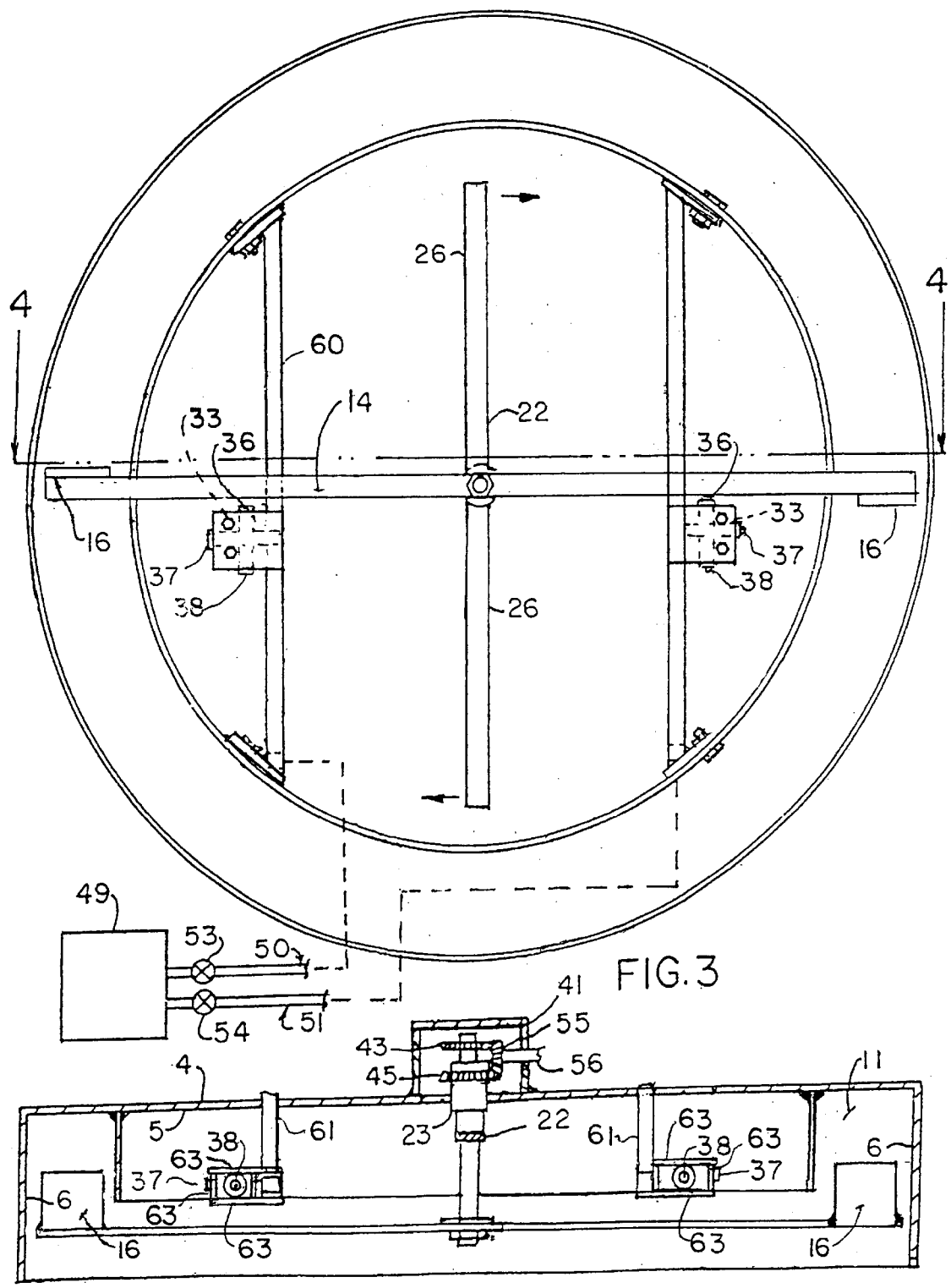
FIG. 3 is a bottom plan view of a second embodiment of the device, with a source of liquid shown somewhat diagramatically.
FIG. 4 is a sectional view taken along the line 4—4 of FIG. 3.
Figure 8:
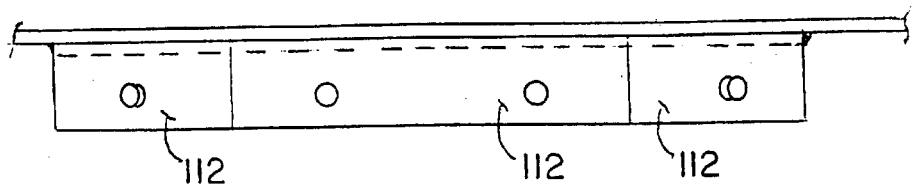
FIG. 8 is a view in front elevation in the direction shown by the line 8—8 in FIG. 5.
Figure 9:
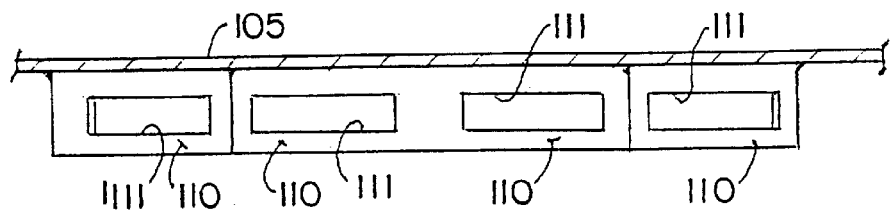
FIG. 9 is a fragmentary sectional view taken along the line 9—9 of FIG. 5.
Figure 10:
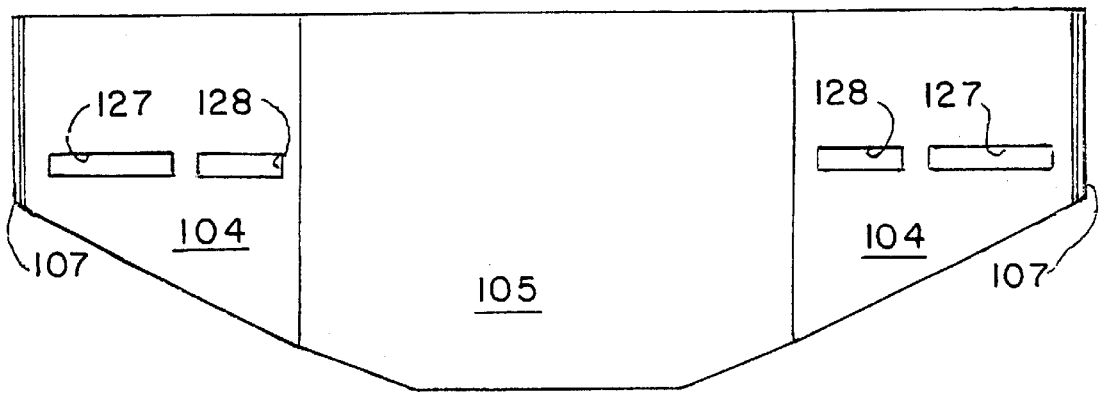
FIG. 10 is a top plan view of this embodiment, with spray boxes removed, showing spray-admitting slots in the housing top wall.

In the embodiment shown in FIGS. 3 and 4, conduits 60, which also can be square tubing, as fastened to the inner wall of the baffle, and fed by supply lines 61, located radially outboard of the fan blades' tips, extending vertically through the top wall of the housing. The spray tips are shown as protected by plates 63, from between which the tips project only far enough to permit their being directed as desired.

In both embodiments, at their outer ends, the conduits, by way of supply lines 50 and 51, are connected to a tank 49 which holds liquid under pressure. Valves 53 and 54, in the supply lines 50 and 51, can be solenoid operated, so that the flow of liquid from the tank 49 can be directed to one or the other of the nozzles, both of them, or neither, from the tractor or from the handle of a self-propelled mower, as the case may be.

Figure 2:
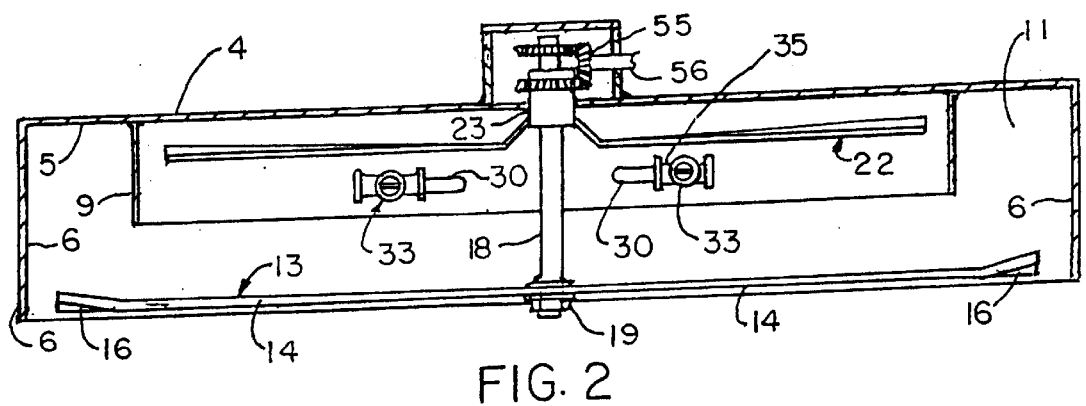
FIG. 2 is a sectional view taken along the line 2—2 of FIG. 1.

The direction of travel of the mower is parallel to the nozzles 37, so that if the mower moves from right to left as viewed in FIG. 1 or 3, for example, nozzle 37 on the left is spraying forwardly, and the nozzle 37 on the opposite side of the shaft is spraying rearwardly. As can be seen in FIG. 2, the arms 26 of the fan blade are curved about 45 degrees so as to blow air, hence the liquid spray, down, in a direction toward the cutter blades 13, thence onto vegetation being mowed, within the compass of the baffle wall. The cutter blade arms are also turned or curved for blowing upwardly, through the area under the plenum 11, to blow upwardly within the plenum 11. The remainder of the reach of arms 14 of the cutter blade is flat, so as not to interfere with the downward movement of air and spray provided by the fan blades. Merely by way of illustration, with the housing with a 50 inch inside diameter, with a side wall height of 9 inches, the baffle wall can be 6 inches deep, with an inside diameter of 30 inches. The fan blades, curved at about 30 degrees, can extend to within 1-½ inches of the inside surface of the baffle wall, particularly if instead of being mounted in the side wall and baffle wall, the conduits are mounted in the top wall, outboard of the tips of the fan blade, and the chemical supply lines connected to fittings projecting from the top of the housing. With the arrangement described in the first embodiment, the blades can extend more closely to the inner surface of the baffle wall. The cutter blade can be about 48 inches long, measured diametrically with the last six to eight inches of each arm curved at about 45 degrees. The arrangement of this embodiment can be applied to one mower or a plurality of mowers, as in a bat-wing configuration. In both embodiments described, the hitches, power take-offs, and mower drives are conventional.

Numerous variations in the construction of these first two embodiments of mower applicator of this invention, within the scope of the appended claims, will occur to those skilled in the art in the light of the foregoing disclosure. Merely by way of example, the cutter blade and fan blade can be mounted on the same shaft, and therefore rotate in the same direction and at the same speed, but the counter rotation is preferred. The nozzles 36, 37 and 38 can be made identically, or can be made to provide different spray patterns. The size of their orifices can be varied to provide any size of particle, and in that respect, also, the nozzles even in the same head can be the same or different. As has been indicated, the spray pattern of each nozzle is horizontal, i.e., parallel to the planes of rotation of the blades. This is an important feature, because it permits careful control of the size of the particles of liquid, and prevents atomization of the liquid. However, some deviation from the horizontal may be permitted or even desired in some applications. The amount of pressure with which the liquid is supplied to the nozzles can be varied, depending upon the desired size of the droplets, their distribution pattern, and the volume of liquid to be applied. The curvature of the blades can be varied, although the placement of the curvature of the cutter blades should remain at the ends, so as to limit the upward flow of air to the plenum. The speed of rotation of the two blades can be different, the cutter blade for example, running at a higher speed than the fan blade. The means for driving the blades can be different from the gears indicated, as for example two belt drives. The size and application of the mower applicator can vary from large bat wing types of mowers to hand operated types. The dimensions of the elements will, of course, be commensurate with the size of the mower, just as the pitch of the curvature of the arms of the blades will depend in part upon the speed of revolution of the blades. The number of arms of either of the cutter blade or the fan blade can be varied, as long as they are balanced. The relative sizes and the shapes of the housing and baffle wall can be varied. The housing can be square in plan, for example, or the baffle wall polygonal, although the circular baffle wall is preferred. Although the baffle wall is preferably welded to the inner surface of the top wall of the housing, it can be supported from the side wall, for example, if desired. An advantage of having two nozzles, one on either side of the cutter blade shaft, is that weeds are hit from both sides as the mower passes over them. For light application, only one, preferably the forward nozzle, can be actuated. A single nozzle, or a multiplicity of nozzles can be provided and employed. Although the cutter blade is preferably formed to blow upwardly to expel cut material from the mower, it is the downward blowing of the fan that is a novel feature of this embodiment of the invention, the action of the cutter blade in blowing upwardly being conventional, except for its being limited to the general area of the plenum. The baffle wall is uninterrupted except for the openings through which the conduit extends, and those are effectively sealed around the conduit, but minor interruptions can be tolerated, if necessary, although they preferably are avoided. These variations are merely illustrative.

Referring now to FIGS. 5–9 for a third embodiment of mower-applicator of this invention, reference numeral 101 indicates a batwing mower with a center mower 102, and two outboard mowers, which, in the drawings, are shown as mirror images of one another. Each of the outboard mowers has a top wall and side walls of the sort shown in FIGS. 2 and 4. The center mower also has a top wall 105, and side walls. The center mower 102 has at its leading edge, in the embodiment shown, three plates making up a curtain wall 110, welded to the top wall. Each of the plates has a slot 111, parallel to the top wall 105 and the ground. Angle iron brackets 112, forward of the curtain wall 110 serve to mount nozzles 114, as shown in FIG. 7. The nozzles direct spray through the slots, generally parallel to the ground and above the cutter blades, which can be the same as those shown in FIGS. 1–4 and described. In this embodiment, the fan blades may be eliminated, but when they are used, the spray is projected between them and the cutter blades.

In the side mowers, in the embodiment illustrated, although an arrangement of curtain wall and brackets similar to the one shown in the center mower can be used, it has been found useful to introduce spray from the top, through spray boxes 120 and 121. The spray boxes 120 and 121 have an open top 122 and an open bottom, and have on their leading side a transparent wall 123, of Plexiglass or the like, through which the operation of the sprayers can be observed. Spray nozzles 125 are mounted in the boxes 120 and 121, directed vertically downwardly, to project spray 126 through slots 127 and 128 respectively. The difference in dimensions of the boxes 120 and 121 is dictated by clearance problems with support structure and drive structure, and has no other significance.

By mounting the spray nozzles behind the curtain wall slots, and behind the slots in the top wall of the housing, they are protected from harm by rocks and the like thrown by the blades.

Numerous variations in the construction of the last embodiment described, within the scope of the appended claims will occur to those skilled in the art in the light of the foregoing disclosure. Merely by way of example, as has been indicated, the side mowers can be provided with curtain walls and brackets as is the center mower. The curtain wall can be provided by the conventional side wall, with either angle iron brackets or an outer, forward wall within which the nozzles are mounted. As a practical matter, the spray box arrangement of the side mowers can not be used in the center mower, because of the power take-off, blade drive, and mower support systems. In the arrangement in which both fan blades and cutter blades are utilized, the functions of the blades is the same as described in connection with the first two embodiments. In the spray boxes, a top wall can be provided in which fittings for the nozzles and the supply pipes can be mounted, the top wall being bolted or otherwise removably mounted on the boxes. Where the fan blades are within the compass of a baffle wall, the spray nozzles can be surrounded by a heavy shield, either in the form of plates, or of a heavy cylinder surrounding the spray nozzle, to project spray through slots in the baffle wall. As with the first two embodiments, the variations suggested here are merely illustrative.

What is claimed is:

1. In a mower and liquid applicator having a housing with a top wall and a depending side wall, and a cutter blade mounted to be rotated on a vertical central axis to define a plane of rotation, the improvement comprising a baffle wall spaced inboard from said housing side wall and extending downwardly from said housing top wall to a place above said cutter blade and inboard of outer ends of arms of said cutter blade; a fan blade mounted to be rotated on an axis coincident with the axis of rotation of said cutter blade to define a plane of rotation above and substantially parallel to the plane of rotation of said cutter blade, said fan blade being spaced inboard of and within the compass of said baffle wall; spray conduit fixed with respect to said housing and said baffle wall and a spray nozzle operatively connected to said conduit and positioned between the planes of rotation of said cutter blade and said fan blade, said fan blade being formed to direct air downwardly toward the cutter blade.

2. The device of claim 1 wherein the nozzle is a flat fan tip providing a spray pattern substantially parallel to the planes of rotation of the blades.

3. The device of claim 1 wherein the conduit extends substantially parallel to and between the planes of rotation of said cutter blade and said fan.

4. The device of claim 1 wherein two conduits are provided, spaced from one another and positioned at either side of the axis of rotation, each with a nozzle.

5. The device of claim 1 wherein the cutter blade has symmetrically placed arms, with outer ends projecting beyond said baffle wall, canted to serve to blow air upwardly toward said housing top wall within the area between the housing side wall and the baffle wall, and said fan blade is canted to blow air downwardly within the compass of the baffle wall.

6. The device in claim 4 wherein one of said nozzles is positioned forward of said axis of rotation with respect to the direction of movement of said mower, and the other is positioned rearward of said axis of rotation with respect to the direction of travel of said mower.

7. The device of claim 4 wherein the conduits are operatively connected to a source of liquid under pressure and valves are provided between said source and said nozzles, whereby the flow of liquid through one or another or both of said nozzle conduits can be shut off selectively.

8. The device of claim 1 wherein the fan blade and the cutter blades are counter rotating.

9. The device of claim 1 wherein the spray nozzles are mounted in three openings of a four-way Tee, one nozzle oriented substantially forwardly parallel to the direction of movement of said mower and two nozzles oriented substantially at right angles to said forwardly projecting nozzle.

10. The device of claim 1 wherein the baffle wall is essentially uninterrupted.

11. The device of claim 4 wherein the nozzles are directed to project liquid substantially parallel to the planes of rotation of the cutter fan blades.

12. The device of claim 1 wherein the ends of the cutter blades projecting beyond the baffle wall are curved to move air upwardly toward the top of the housing in the space between the baffle wall and the side wall of the housing, and the blade reach between the axis of rotation and the outer curved ends of the blade is flat.

13. In a mower and liquid applicator having a housing with a top wall, a depending side wall, and an open bottom, and a cutter blade along the open bottom, mounted to be rotated on a vertical shaft supported by said housing to define a plane of rotation, the improvement comprising a baffle wall, circular in plan, spaced inboard from said housing side wall to define therewith a plenum, and welded to and extending downwardly from said housing top wall to a place above said cutter blade and inboard of outer ends of arms of said cutter blade; said cutter blade arms being curved in the area under said plenum to blow air upwardly into said plenum, a fan blade mounted to be rotated on an axis coincident with the axis of rotation of said cutter blade to define a plane of rotation above and substantially parallel to the plane of rotation of said cutter blade, said fan blade being spaced inboard of and within the compass of said baffle wall and being formed to direct air downwardly toward the cutter blade; spray conduits fixed with respect to said housing and said baffle wall and operatively connected to spray heads in the form of four-way Tees, in three openings of which Tees, flat fan nozzles are mounted, said spray nozzles being directed to project spray in a pattern between and substantially parallel to the planes of rotation of said cutter blade and said fan blade, one of said heads being forward of said blade shaft with respect to the direction of movement of the mower, with a nozzle oriented forwardly, and the other of said heads being rearward of said shaft with a nozzle oriented rearwardly, two other nozzles in each of said heads being directed substantially at right angles to said forwardly and rearwardly directed nozzles, and among them, said nozzles distributing spray over substantially the entire area of a plane within the compass of said baffle wall.

14. In a mower and liquid applicator having a cutter blade rotated on a vertical central axis to define a plane of rotation, and a nozzle connected to a source of liquid spray, a member, fixed against rotation, positioned between said cutter blade and said nozzle, said member having an elongated slot, and said nozzle being positioned outboardly of said slot to project spray through said slot above said cutter blade and said nozzle projecting parallel to the plane of rotation of the cutter blade, but to be protected by the member from damage.

15. The mower and liquid applicator of claim 14 including a fan blade positioned above said cutter blade and rotated about a vertical axis coaxial with said cutter blade axis, said spray being projected between said fan blade and said cutter blade.

16. In a mower and liquid applicator having a housing with a top wall with a leading edge, and a cutter blade mounted to be rotated on a vertical central axis to define a plane of rotation, the improvement comprising a heavy plate secured at said leading edge, and depending therefrom, said plate having a slot directed substantially parallel to the plane of said top wall, a bracket spaced outboardly from said plate, and a spray nozzle mounted on said bracket outboardly of said slot, directed to project spray through said slot in a direction toward the axis of rotation of said blade, and said nozzle projecting parallel to the plane of rotation of said cutter blade.

17. The mower and liquid applicator of claim 16 wherein the mower and liquid applicator of claim 16 is a central unit of a symmetrical bat-wing mower-applicator.

18. The mower and liquid applicator of claim 17 wherein two outboard mower and liquid applicator units flank said central unit, one on each side, and each of said outboard mower and liquid applicator units has a top wall, a box mounted on said top wall, said box having an open bottom surrounding a slot through said top wall, and a spray nozzle mounted in said box and directed to project spray through said slot.

* * * * *